W. LEWIS.
MOLDING MACHINE.
APPLICATION FILED JULY 27, 1917.
1,259,882.
Patented Mar. 19, 1918.
2 SHEETS—SHEET 2.
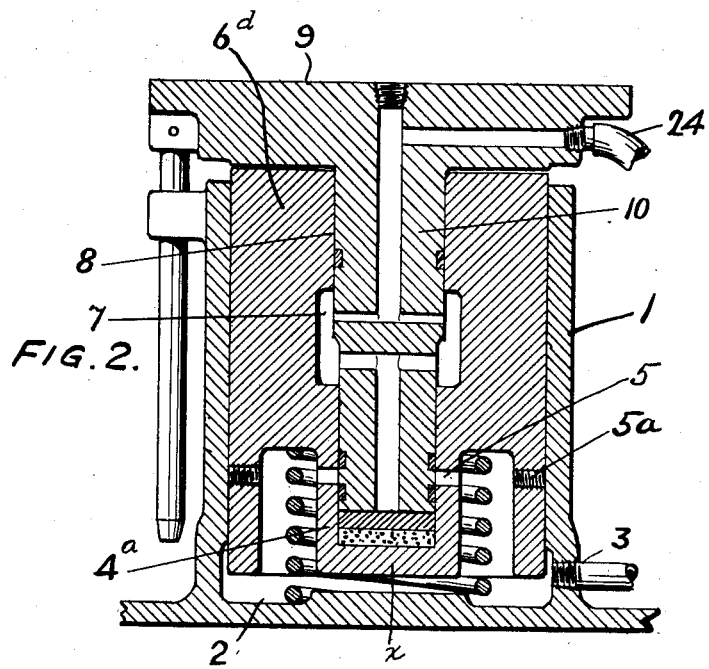
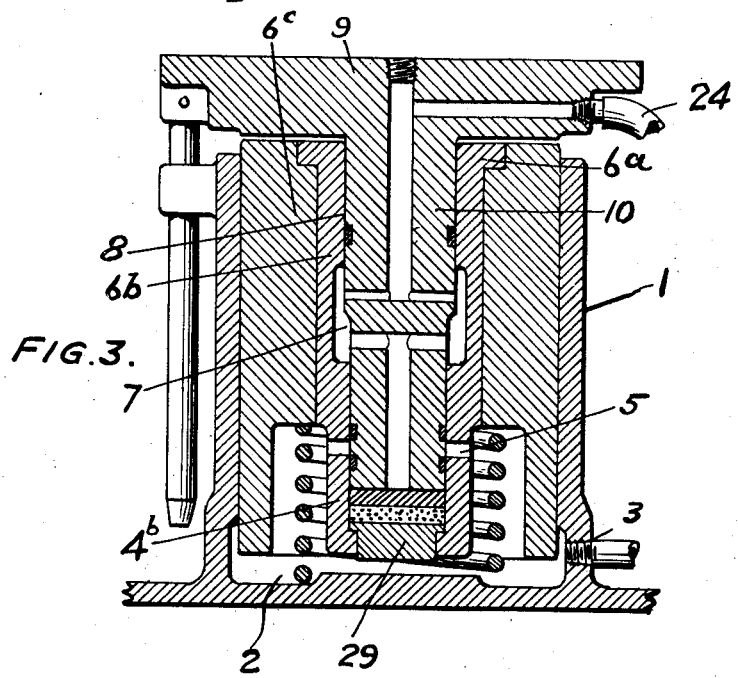
WITNESS:
INVENTOR
Wilfred Lewis
BY
Augustus B. Stoughton.
ATTORNEY.

UNITED STATES PATENT OFFICE.

WILFRED LEWIS, OF HAVERFORD, PENNSYLVANIA, ASSIGNOR TO THE TABOR MANUFACTURING COMPANY, OF PHILADELPHIA, PENNSYLVANIA, A CORPORATION OF PENNSYLVANIA.

MOLDING-MACHINE.

1,259,882.   Specification of Letters Patent.   Patented Mar. 19, 1918.

Application filed July 27, 1917. Serial No. 183,055.

*To all whom it may concern:*

Be it known that I, WILFRED LEWIS, a citizen of the United States, and a resident of Haverford, in the county of Montgomery and State of Pennsylvania, have invented certain new and useful Improvements in Molding-Machines, of which the following is a specification.

The principal object of the present invention is to provide a valveless molding machine of extreme simplicity in construction and useful in a variety of ways, for example as a squeezer, a shockless jarring machine, or a simple jarring machine.

The invention will be claimed at the end hereof, but will be first described in connection with the embodiment of it chosen for illustration in the accompanying drawings, in which—

Fig. 2, is a similar view, with parts omitted, illustrating a modification, and

Fig. 3, is a similar view illustrating another modification.

Figure 1:
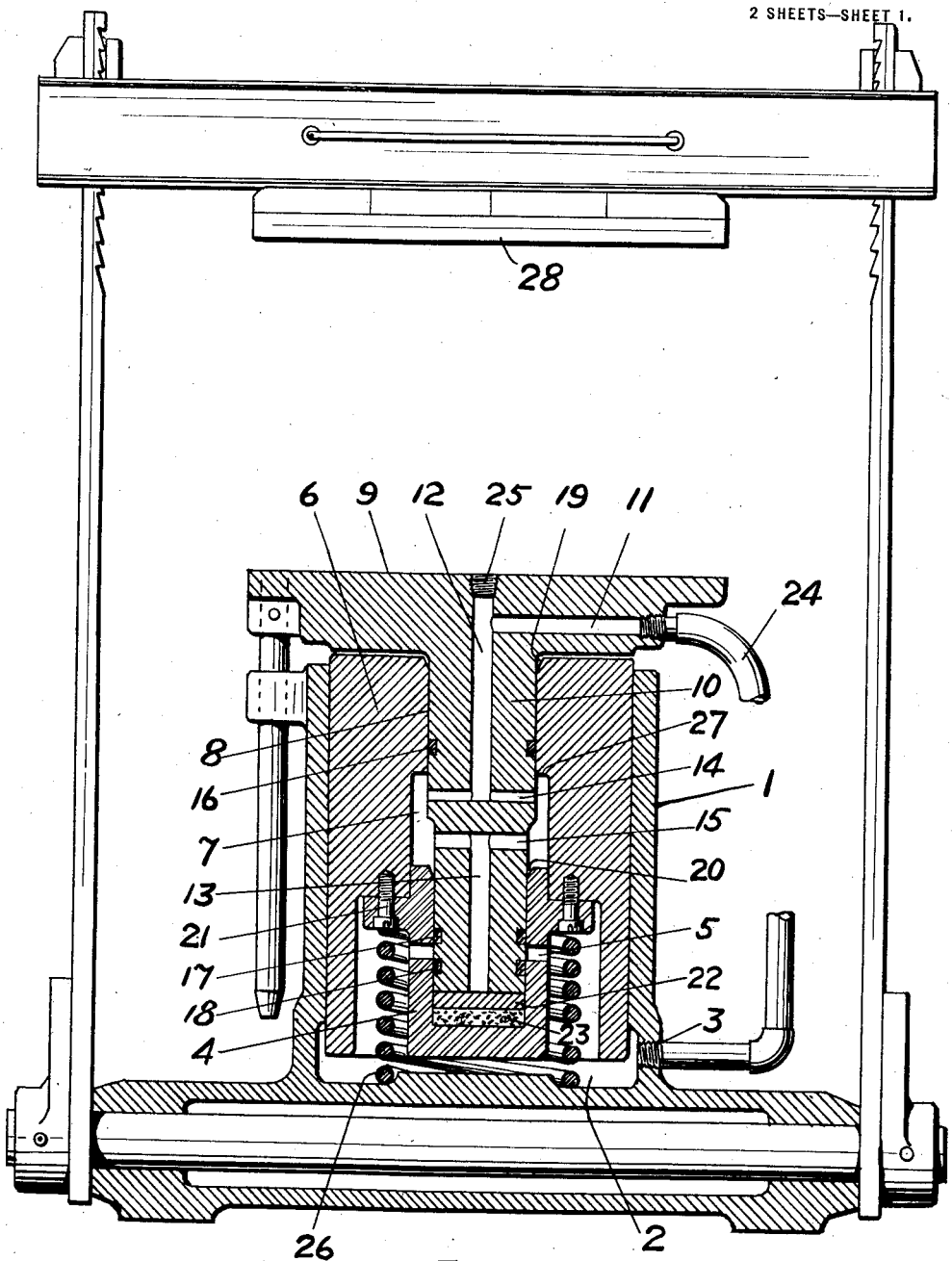
Figure 1, is a view principally in section.

In the drawing 1 is a fixed cylinder having an open end and provided at its closed end 2, with a port 3. There is a piston for the cylinder 1 consisting of a relatively small cap portion 4, ported as at 5, to the fixed cylinder, and an interconnected relatively large tubular portion 6, of relatively large bore to form a port-recess 7 and of smaller bore 8 near its upper end to form, with the cap portion, a plunger chamber. 9, is a table or mold support arranged above the described piston and it is provided with a plunger 10 arranged in the plunger chamber and with an air inlet 11 to the plunger, which latter is provided with spaced axial passages 12 and 13; one, 12 from the air inlet 11, and the other, 13, to the plunger chamber, and with radial air passages 14 and 15 from the inner separated or spaced ends of the axial passages for coöperation with the port-recess 7. The plunger is provided with packing rings 16, 17 and 18, arranged as shown, and the lower portion of the plunger is somewhat smaller than the upper portion of the plunger, which is a matter of convenience in respect to the packing rings 17 and 18. The chamfered surfaces 19 and 20 facilitate the insertion of the plunger and its packing rings into the plunger chamber. 22, is a metal washer and 23, a cork or equivalent cushion arranged under it and both of these elements are mounted in the cap 4. 24, is a hose connection for the passage 11. The opening 12 may be drilled, and when this is done the plug 25 can be used to close the opening. 26, is a spring arranged in the cylinder 1 and its function is to counterbalance the weight of the parts 4 and 6, although as will appear from the following description this spring can be removed or omitted.

The ports 5, as well as the ports 14 and 15, are shown to consist of radial openings or holes. The distance from the bottoms of the ports 5 to the lower end of the plunger 10, when the latter is in its lowermost position, is substantially the same as the distance from the bottom of the ports 14 to the cut-off surface or edge 27 of the recess 7. In consequence of this, reliance is had upon the momentum of the parts to effect the necessary air control without the employment of valves.

In Fig. 1, 21 are means for interconnecting the parts 4 and 6. In Fig. 2, the parts $4^a$ and $6^d$ are interconnected by making or casting them in one piece, and in this case the ports 5 may be made by boring holes from the exterior and then plugging the parts $5^a$ of these holes. In Fig. 3, the hole through the part $6^c$ is enlarged and provided with a seat $6^a$ for supporting a flange formed on a lining or prolongation $6^b$, of the part $4^b$, so that in effect the prolongation $6^b$ becomes a part, in the nature of a lining or bushing of the part $6^c$, and is provided with the port-recess 7. The bushing $6^b$ may be integrally closed at its end as shown at $x$, Fig. 2, or it may be left open for convenience in manufacture and then closed by a plug 29, Fig. 3. These alternate forms are really all the same thing in principle, and other modifications obviously may be made without departing from the spirit of the invention.

As has been said the described parts are capable of a variety of uses as will be readily understood by those skilled in the art and a description will now be given of some of those uses, without intending to preclude all the uses of which the mechanism is capable and in connection with a molding machine.

The mode of operation of the described mechanism in shockless jar molding is as follows: The port 3 is connected with the atmosphere and air is introduced at the inlet 24. The inlet air traverses the passages 11, 12, 14, recess 7, passages 15 and 13, and so enters the plunger chamber below the plunger, with the result that the plunger and its table 9 rise until the ports 5 are open and the passages 14 are closed. Then the air trapped in the recess 7, passage 13, and plunger chamber escapes by the ports 5, but this air, being somewhat choked at the outlet 3, lifts the part 6, which is counterbalanced by the spring 26, and the part 9 descending strikes the part 6 ascending at the end of the plunger 10 and on the cushioned washer 22, so that the shock or impact takes place in the air.

In again assuming the position of the parts shown in the drawing, the cushion gives the plunger a slight initial upward tendency. This operation is repeated as long as air is admitted at 24, and it is well understood in the art. However, it is the simplicity of construction and the absence of valves which is an important feature of the present invention.

In some instances and for some purposes it is desirable to lift the table 9 without moving the other parts of the machine in relation to each other. An illustration of this is when it is desired to squeeze. For this purpose, air is admitted to the port 3 with the result that the part 6 Fig. 1, 6$^d$ Fig. 2, and 6$^c$, Fig. 3, and everything connected with and carried by it, including the mold support or table 9, are lifted, for example, toward the head 28.

By removing the spring 26, the parts 6 Fig. 1, 6$^d$, Fig. 2, and 6$^c$, Fig. 3, are supported on the part 2 and then if air be admitted at 24 the machine will operate as an ordinary jarring machine and the shock will be taken by the part 2, but even if the spring 26 be omitted, the jarring can be made shockless by sufficiently choking the outlet 3.

It may be observed that the passages 14 are somewhat smaller than the passages 15 and by reason of this relative difference in size the operation of the parts, as a shockless jarring machine, is improved.

What I claim is:

1. A molding machine comprising the combination of a fixed cylinder having an open end and ported at its closed end, a piston for said cylinder consisting of a relatively small cap-portion ported to the fixed cylinder and an interconnected relatively large tubular portion of relatively large bore to form a port-recess and of smaller bore near its upper end to form with the cap-portion a plunger chamber, a table above the piston and provided with a plunger arranged in the plunger chamber and with an air inlet to the plunger which latter is provided with spaced axial passages from the air inlet and to the plunger chamber and with radial air passages from the inner ends of the axial passages for coöperation with said port-recess, a cushion interposed between the cap and plunger, and a spring around the cap and between the fixed cylinder and the piston.

2. A molding machine comprising the combination of a fixed cylinder having an open end and ported at its closed end, a piston for said cylinder consisting of a relatively small cap-portion ported to the fixed cylinder and an interconnected relatively large tubular portion of relatively large bore to form a port-recess and of smaller bore near its upper end to form with the cap-portion a plunger chamber, a table above the piston and provided with a plunger arranged in the plunger chamber and with an air inlet to the plunger which latter is provided with spaced axial passages from the air inlet and to the plunger chamber and with radial air passages from the inner ends of the axial passages for coöperation with said port-recess, and a cushion interposed between the cap and plunger.

3. A molding machine comprising the combination of a fixed cylinder having an open end and ported at its closed end, a piston for said cylinder consisting of a relatively small cap-portion ported to the fixed cylinder and an interconnected relatively large tubular portion of relatively large bore to form a port-recess and of smaller bore near its upper end to form with the cap-portion a plunger chamber, a table above the piston and provided with a plunger arranged in the plunger chamber and with an air inlet to the plunger which latter is provided with spaced axial passages from the air inlet and to the plunger chamber and with radial air passages from the inner ends of the axial passages for coöperation with said port-recess.

4. A molding machine comprising the combination of a fixed cylinder having an open end and ported at its closed end, a piston for said cylinder having a plunger chamber open at the top and closed at the bottom and provided near the bottom with a port to the cylinder and intermediate of its length with a connecting port-recess, a table above the piston and provided in the plunger chamber with a plunger having intermediate of its length spaced sets of radial ports for coöperation with the connecting port-recess and having axial ports, one from one set of radial ports through its end to the plunger chamber and another from the other set of radial ports through the table, a spring for the piston, and a cushion for the plunger.

5. A molding machine comprising the combination of a fixed cylinder having an open end and ported at its closed end, a piston for said cylinder having a plunger chamber open at the top and closed at the bottom and provided near the bottom with a port to the cylinder and intermediate of its legnth with a connecting port-recess, a table above the piston and provided in the plunger chamber with a plunger having intermediate of its length spaced sets of radial ports for coöperation with the connecting port-recess and having axial ports one from one set of radial ports through its end to the plunger chamber and another from the other set of radial ports through the table, and a spring for the piston.

6. A molding machine comprising the combination of a fixed cylinder having an open end and vented at its closed end, a piston for said cylinder having a plunger chamber open at the top and closed at the bottom and provided near the bottom with a port to the cylinder and intermediate of its length with a connecting port-recess, and a table above the piston and provided in the plunger chamber with a plunger having intermediate of its length spaced sets of radial ports for coöperation with the connecting port-recess and having axial ports one from one set of radial ports through its end to the plunger chamber and another from the other set of radial ports through the table.

7. In a molding machine the combination of a cylinder open at its top and closed at its base and provided above the base with an exhaust port and above the exhaust port with a connecting port-recess, a plunger coöperating with the exhaust port and having two sets of non-communicating radial ports coöperating with the recess and having an axial passage from the lower set to the cylinder and from the upper set upward, and a table mounted on the plunger and provided through its body with an air channel communicating with the upward passage.

8. In a molding machine the combination of a plunger chamber and a plunger formed with ports of which the walls constitute valves, and a mold support carried by the plunger and having through its body an air supply passage communicating with said ports, substantially as described.

WILFRED LEWIS.